US010859750B1

(12) United States Patent
Lai

(10) Patent No.: US 10,859,750 B1
(45) Date of Patent: Dec. 8, 2020

(54) LUMINOUS PAD

(71) Applicant: E-CENTURY TECHNICAL & INDUSTRIAL CORPORATION, New Taipei (TW)

(72) Inventor: I-Kuang Lai, New Taipei (TW)

(73) Assignee: E-CENTURY TECHNICAL & INDUSTRIAL CORPORATION, New Taipei (TW)

( * ) Notice: Subject to any disclaimer, the term of this patent is extended or adjusted under 35 U.S.C. 154(b) by 0 days.

(21) Appl. No.: 16/699,665

(22) Filed: Dec. 1, 2019

(51) Int. Cl.
  *F21V 8/00* (2006.01)
  *G06F 3/039* (2013.01)
  *F21V 33/00* (2006.01)

(52) U.S. Cl.
  CPC .......... *G02B 6/001* (2013.01); *F21V 33/0048* (2013.01); *G06F 3/0395* (2013.01)

(58) Field of Classification Search
  CPC .... G02B 6/001; G06F 3/0395; F21V 33/0048
  See application file for complete search history.

(56) References Cited

U.S. PATENT DOCUMENTS

| | | | | |
|---|---|---|---|---|
| 6,635,336 B1 * | 10/2003 | Chen | ..................... | G06F 3/0395 248/346.01 |
| 7,175,310 B1 * | 2/2007 | Cotterell | ............... | G06F 3/0395 362/253 |
| 10,365,422 B2 * | 7/2019 | Hong | ..................... | G06F 3/0395 |
| 10,444,418 B2 * | 10/2019 | Chou | ................... | G02B 6/0031 |
| 10,598,889 B1 * | 3/2020 | Chou | ................... | G02B 6/0056 |
| 2002/0131270 A1 * | 9/2002 | Niemuth | ............. | F21V 33/0048 362/253 |
| 2013/0058129 A1 * | 3/2013 | Limber | ................... | G06F 1/325 362/605 |
| 2016/0155369 A1 * | 6/2016 | Hong | ..................... | G02B 6/001 362/559 |

* cited by examiner

*Primary Examiner* — Isiaka O Akanbi
*Assistant Examiner* — Nathaniel J Lee
(74) *Attorney, Agent, or Firm* — Chun-Ming Shih; HDLS IPR Services

(57) ABSTRACT

A luminous pad connected to a transmitter includes a pad body, a light guide strip, a light source module, an electrical object, and a pad surface stitch. The pad body has two pad surfaces; the light guide strip has first and second positions and surrounds the pad body; the light source module is installed at the first position and connected to the transmitter; the electrical object is installed at the second position; a pad surface stitch of a conductive wire is sewed between the two pad surfaces and connected between the electrical object and transmitter, so that the electrical object and transmitter are electrically conducted with each other through the pad surface stitch. This disclosure has the effects of transmitting electric power and/or signals to the electrical object through the pad surface stitch by the transmitter and maintaining the aesthetic appearance and ensuring the flatness of the luminous pad.

12 Claims, 6 Drawing Sheets

LUMINOUS PAD

BACKGROUND OF THE INVENTION

1. Technical Field

The technical field relates to a luminous pad, and more particularly to the luminous pad having an external transmission wire.

2. Description of Related Art

In general, a light guide strip requires additional wiring for the following reasons: (1) Additional electrical object other than the original light emitting source is added; and (2) The light guide distance becomes longer as described below.

For the first reason, it is necessary to additionally connect an external electric wire between the additional electrical object and power supply, after the additional electric object is added.

For the second reason, the light emitted by the original single light emitting source cannot pass through the whole light guide strip when the light guide distance of a light guide strip used to surround a luminous pad becomes longer, so that the light guide strip produces dark areas to where the light cannot be guided, and the luminous effect will be affected adversely. Therefore, the discloser of this disclosure adds another light emitting source to emit light to the portion where the original light guide fails, so as to eliminate the dark areas. However, this arrangement creates another problem. When the power supply electrically connected to the original light emitting source also supplies power to the other light emitting source, the only way is to additionally connect the external electrical wire.

In other words, regardless of the aforementioned two reasons, it is necessary to additionally connect an external electrical wire. Once the additional external electrical wire is added, the external electrical wire will be exposed from the light guide strip, not just affecting the aesthetic appearance of the luminous pad only, but also affecting the flatness of the luminous pad due to the existence of the external electrical wire.

In view of the aforementioned drawback of the prior art, the discloser of this disclosure based on years of experience in the related industry to conduct extensive research and experiment, and finally provided a feasible solution as disclosed in this disclosure to overcome the drawback of the prior art.

SUMMARY OF THE INVENTION

Therefore, it is a primary object of this disclosure to overcome the aforementioned drawback of the prior art by providing a luminous pad, wherein a stitch of a conductive wire formed on a surface of a luminous pad is sewed to the required external transmission wire, so that a transmitter can transmit electric power and/or signals through the external transmission wire to the additionally added electrical object.

To achieve the aforementioned and other objectives, this disclosure discloses a luminous pad coupled to a transmitter and comprising: a pad body, having two opposite pad surfaces; a light guide strip, having a first position and a second position defined thereon, and the light guide strip surrounding the pad body; a light source module, installed at the first position and coupled to and electrically conducted with the transmitter; an electrical object, installed at the second position; and a pad surface stitch, belonged to the conductive wire, and sewed between the two pad surfaces, and coupled between the electrical object and the transmitter, so that the electrical object and the transmitter are electrically conducted with each other through the pad surface stitch.

Compared with the prior art, this disclosure has the effects of transmitting electric power and/or signals to the electrical object through the pad surface stitch by the transmitter as well as maintaining the aesthetic appearance and ensuring the flatness of the luminous pad.

DESCRIPTION OF THE PREFERRED EMBODIMENTS

The technical contents of this disclosure will become apparent with the detailed description of preferred embodiments accompanied with the illustration of related drawings as follows. It is intended that the embodiments and drawings disclosed herein are to be considered illustrative rather than restrictive.

Figure 1:
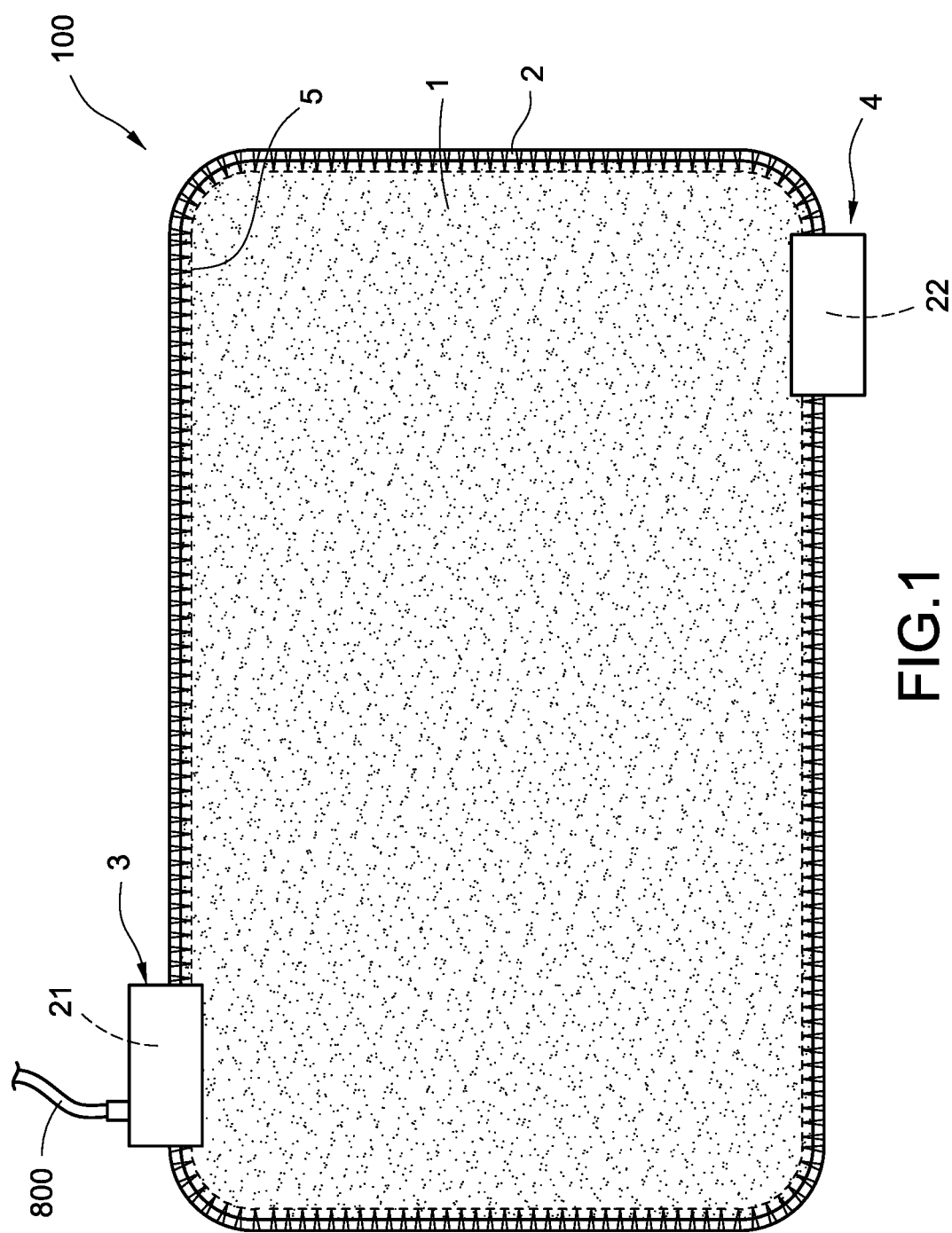
FIG. 1 is a top view of a luminous pad of this disclosure.
Figure 2:
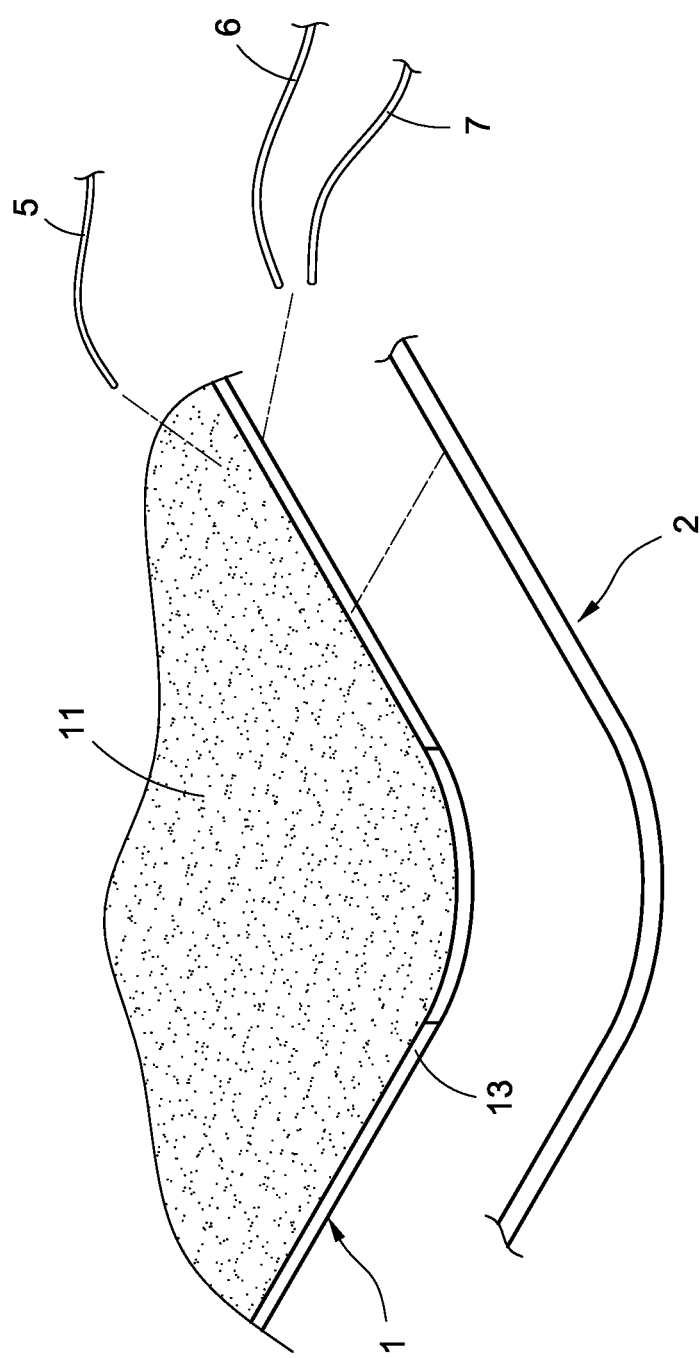
FIG. 2 is a partial blowup view of a luminous pad of this disclosure.
Figure 3:
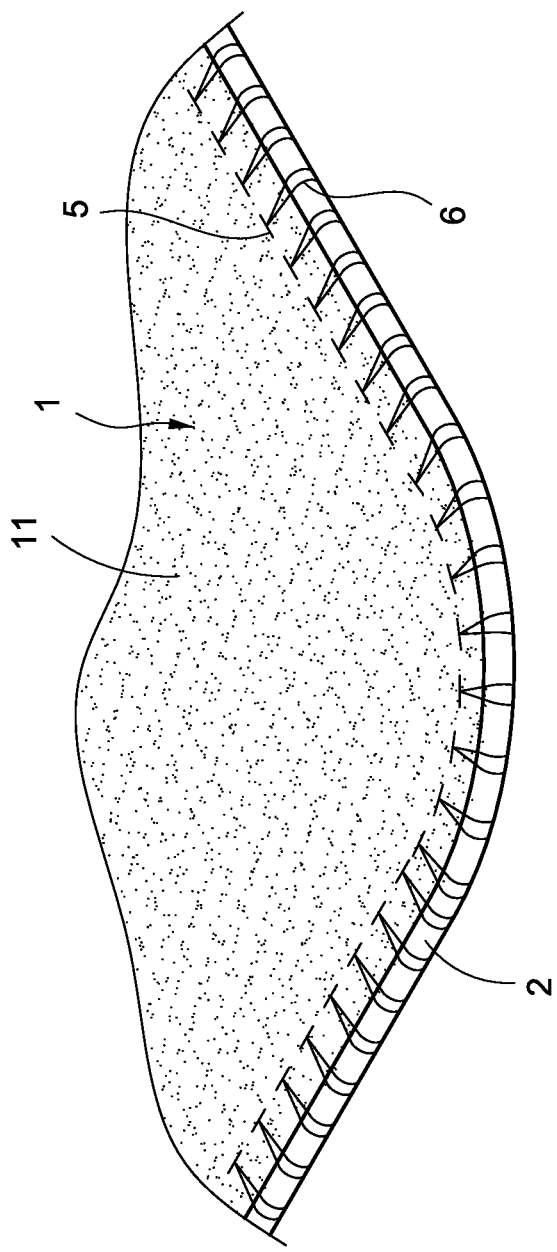
FIG. 3 is a perspective view based on FIG. 2 of this disclosure.

With reference to FIGS. 1 to 3 for a luminous pad 100 of this disclosure, the luminous pad 100 is coupled to a transmitter 800 (capable of transmitting electric power and/or signals), so that the transmitter 800 can transmit electric power and/or signals to the luminous pad 100, wherein the transmitter 800 includes but not limited to a power supply that transmits electric power or a controller that transmits signals. The luminous pad 100 comprises a pad body 1, a light guide strip 2, a light source module 3, an electrical object 4 and a pad surface stitch 5.

The pad body 1 has two pad surfaces and a pad edge 13. The two pad surfaces are configured to be opposite to each other, and the periphery of the two pad surfaces is surrounded and coupled by the pad edge 13.

The periphery of the pad body 1 is surrounded by the light guide strip 2 by any feasible method such as sewing (as shown in the figure) or adhesion (not shown in the figure). In this embodiment, the stitch as shown in FIG. 1 is provided for sewing the light guide strip 2 to the pad edge 13 of the pad body 1 (as shown in FIG. 2). The light guide strip 2 includes but not limited to an optical-fiber cable. The light guide strip 2 has a first position 21 and a second position 22 defined thereon, and the first position 21 and the second position 22 may be far apart from each other (as shown in FIG. 1), or closed to each other (not shown in the figure). In this embodiment, the first position 21 is near the transmitter 800, and the second position 22 is far from the transmitter 800.

The light source module 3 is installed at the first position 21, and the electrical object 4 is installed at the second position 22. The light source module 3 may be any module capable of emitting light, and the light of the light source module 3 can be projected and guided into the light guide strip 1; the electrical object 4 can be any object that requires electric power, wherein the electrical object 4 of this embodiment is another light source module. The light source module 3 is coupled to and electrically conducted with the transmitter 800, so that the transmitter 800 can transmit electric power and/or signals to the nearby light source module 3. In addition, the light source module 3 and the electrical object 4 may be fixed between the top and bottom of the periphery of the pad body 1 by a method such as a relative clamping method.

The pad surface stitch 5 is belonged to the conductive wire, and basically it can be any stitch for sewing the conductive wire, wherein an enameled wire is used in this embodiment to illustrate this disclosure. The pad surface stitch 5 is sewed between the two pad surfaces. Specifically, the pad surface stitch 5 is sewed continuously and back and forth between the two pad surfaces and coupled between the electrical object 4 and the transmitter 800, so that the electrical object 4 and the transmitter 800 are electrically conducted to each other through the pad surface stitch 5.

Figure 4:
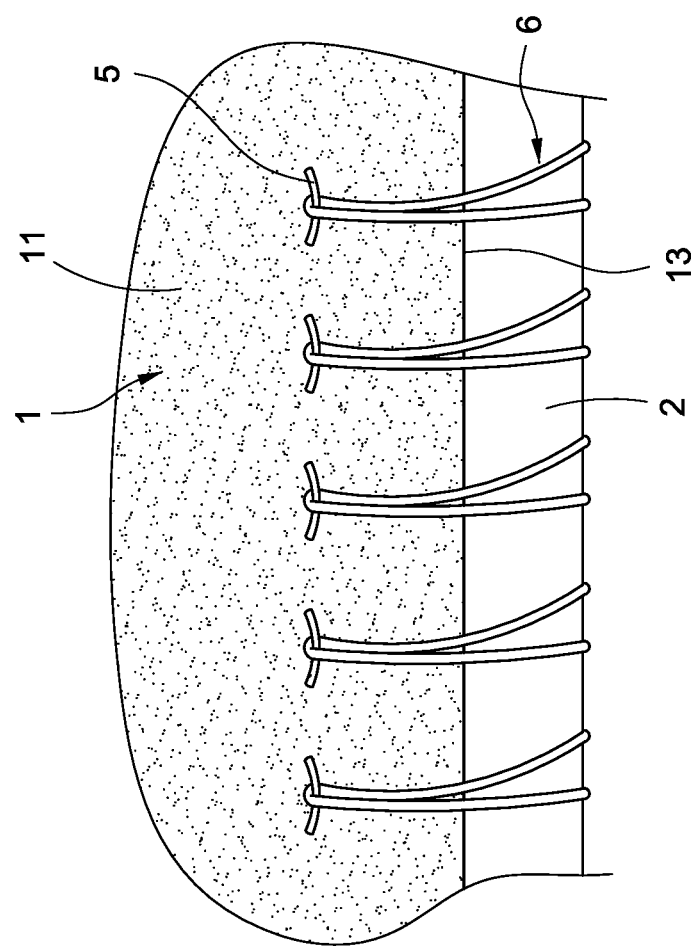
FIG. 4 is a partial blowup view of a first pad surface based on FIG. 3 of this disclosure.
Figure 5:
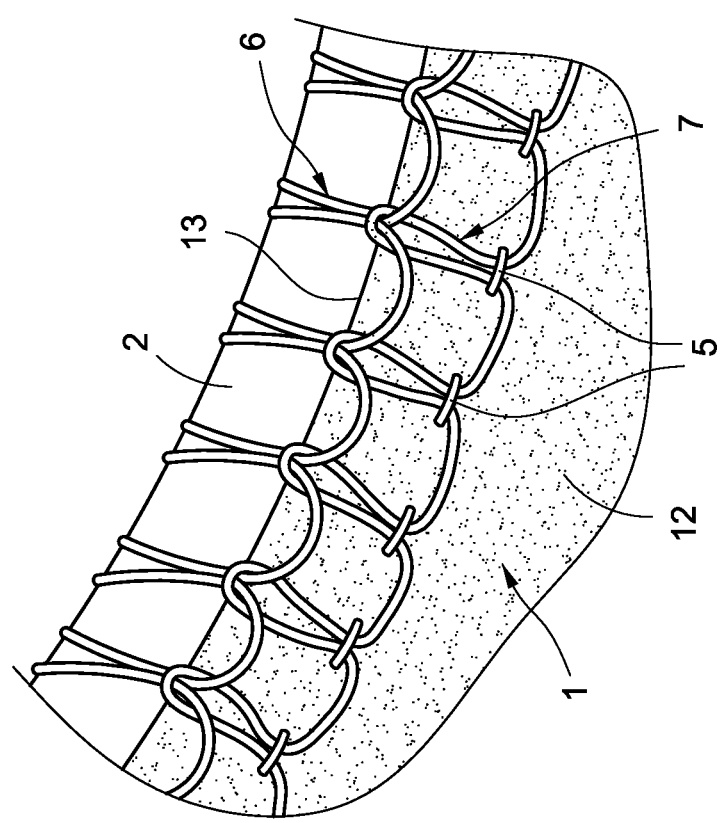
FIG. 5 is a partial blowup view of a second pad surface of a luminous pad of this disclosure.

In FIGS. 4 and 5, the pad surface stitch 5 is sewed continuously back and forth between the two pad surfaces to form a stitch line similar to a dotted line (such as the two dotted lines flatly or substantially flatly attached to the two pad surfaces), and such dotted line indicates the external transmission wire as shown in FIG. 1, and the electrical object 4 is coupled to the transmitter 800 through this external transmission wire, so that the electrical object 4 and the transmitter 800 can be electrically conducted with each other, and the electric power and/or signals can be transmitted. In other words, the transmitter 800 can transmit electric power and/or signals to a remote electrical object 4 through this external transmission wire. If the light guide distance is too long and an additional electrical object 4 is installed, then it will be necessary to add another light source module to prevent the light guide strip 2 from producing dark areas to where the light fails to be guided.

Since the pad surface stitch 5 belonged to the conductive wire is sewed continuously back and forth between the two pad surfaces to form the external transmission wire including the two dotted lines substantially flatly attached to the two pad surfaces, therefore the transmitter 800 can use this external transmission wire to transmit electric power and/or signals to the electrical object 4 and also can maintain the aesthetic appearance and ensure the flatness of the luminous pad 100 because the two dotted lines are (substantially) flatly attached to the two pad surfaces. This effect is more significant, particularly when the pad surface stitch 5 is sewed correspondingly to the pad edge 13 between the two pad surfaces.

In other embodiments not shown in the figures, the pad surface stitch 5 is bridged to any two different parts of the pad body 1 (such as the positions at where the electrical object 4 and the transmitter 800 are situated respectively) by a bridging method. In FIG. 1, the electrical object 4 and the transmitter 800 are disposed at positions far from each other, and the pad surface stitch 5 is bridged directly between the two opposite edges of the pad body 1 (not shown in the figure). Of course, the pad surface stitch 5 may be directly bridged between any two sides of the pad body 1 (not shown in the figure).

In FIGS. 1 to 5, the luminous pad 100 of this disclosure preferably comprises a rolled edge stitch 6 and a connection stitch 7 belonged to an insulated wire as described in details below.

The rolled edge stitch 6 and the connection stitch 7 may be an insulated wire provided for the sewing and fixing purpose, and they are nylon lines used in this embodiment. It is noteworthy that the two pad surfaces of the pad body 1 include a first pad surface 11 as shown in FIG. 4 and a second pad surface 12 as shown in FIG. 5.

The rolled edge stitch 6 passes from the first pad surface 11 around the light guide strip 2 to the second pad surface 12, so as to coil the light guide strip 2 back and forth. Of course, it can be reversed to pass from the second pad surface 12 around the light guide strip 2 to the first pad surface 11, so as to coil the light guide strip 2 back and forth; wherein the light guide strip 2 can be coiled continuously back and forth as shown in the figure or coiled in different segments (not shown in the figure). After the light guide strip 2 is coiled around the rolled edge stitch 6, one of the pad surfaces (such as the first pad surface 11 as shown in FIG. 4) is passed and coiled back and forth around the aforementioned pad surface stitch 5. On the other hand, the connection stitch 7 is passed and coiled back and forth around the other pad surface (such as the second pad surface 12 as shown in FIG. 5) and coupled between the pad surface stitch 5 and the rolled edge stitch 6. Therefore, the light guide strip 2 can be sewed to the pad edge 13 of the pad body 1, and one of the stitches used for sewing the light guide strip 2 can be the pad surface stitch 5 of a conductive wire.

In this embodiment, the pad surface stitch 5, the rolled edge stitch 6, and the connection stitch 7 are used to sew the light guide strip 2 to the pad edge 13 of the pad body 1 by an overlock method. Preferably, the overlock is performed by using a three-needle three-thread method.

Therefore, the light guide strip 2 can be sewed to the pad edge 13 of the pad body 1, wherein one of the stitches is used for sewing the light guide strip 2, and the pad surface stitch 5 is a conductive wire a coupled between the electrical object 4 and the transmitter 800, so that the transmitter 800 can also transmit electric power and/or signals to the electrical object 4 through the pad surface stitch 5.

Figure 6:
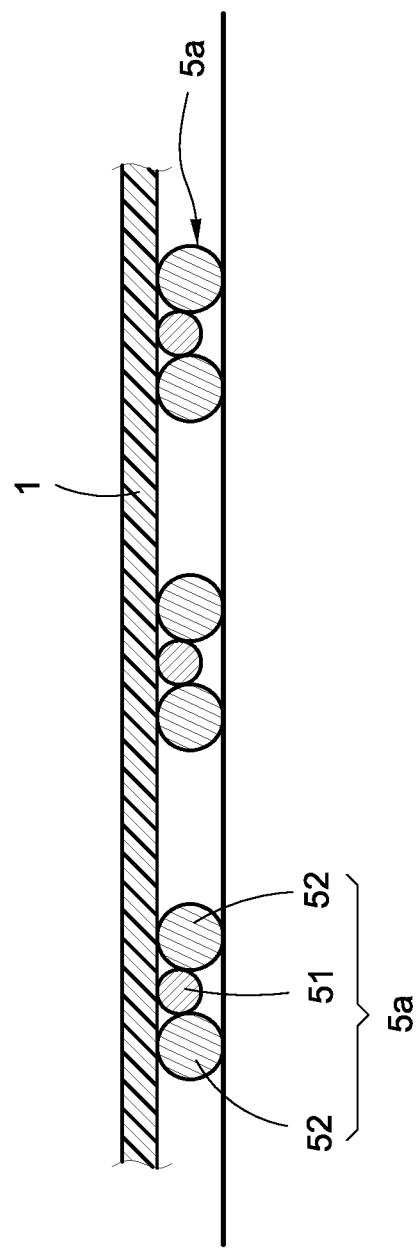
FIG. 6 is a schematic view of a luminous pad of this disclosure showing another embodiment of a pad surface stitch.

In addition, regardless of the pad edge 13 sewed the corresponding pad surface stitch or the pad surface stitch bridging any two different parts of the pad body 1, or it can be in a single-wire form as shown in FIGS. 1 to 5, or a multi-wire form as shown in FIG. 6 (In other words, the form is not limited to a three-wire form or a two-wire form). For example, the pad surface stitch 5a of another embodiment as shown in FIG. 6 comprises two insulated wires 52 and an enameled wire 51 disposed between the two insulated wires 52, and the pad surface stitch 5a is sewed continuously back and forth between the two pad surfaces of the pad body 1 by a single-needle three-thread method; or the pad surface stitch 5a comprises an insulated wire 52 and an enameled wire 51 configured to be parallel to each other in a two-wire form (not shown in the figure), and the pad surface stitch 5a is sewed continuously back and forth between the two pad surfaces of the pad body 1 by a single-needle two-wire method. In a preferred embodiment, the insulated wire 52 is protruded from the pad surface with an extent greater than the extent that the enameled wire 51 is protruded from the pad surface in order to prevent the enameled wire 51 from being short-circuited or damaged by touching other objects. Specifically, the insulated wire 52 as shown in FIG. 6 has a diameter greater than the diameter of the enameled wire 51, but this disclosure is not limited to such arrangement.

In summation of the description above, this disclosure improves over the prior art and has the following effect. The pad surface stitch 5 belonged to the conductive wire is sewed between the two pad surfaces of the pad body 1 and coupled between the electrical object 4 and the transmitter 800, so that the transmitter 800 can use the pad surface stitch 5 to transmit electric power and/or signals to the electrical object 4, and maintain the aesthetic appearance and ensure the flatness of the luminous pad 100 because the two dotted lines of the pad surface stitch 5 are (substantially) flatly attached to the two pad surfaces.

While this disclosure has been described by means of specific embodiments, numerous modifications and variations could be made thereto by those skilled in the art without departing from the scope and spirit of this disclosure set forth in the claims.

What is claimed is:

1. A luminous pad, coupled to a transmitter, comprising:
   a pad body, having two opposite pad surfaces;
   a light guide strip, having a first position and a second position defined thereon, and the light guide strip surrounding the pad body;
   a light source module, installed at the first position, and coupled and electrically conducted to the transmitter;
   an electrical object, installed at the second position; and
   a pad surface stitch, belonged to a conductive wire, and sewed between the two pad surfaces, and coupled between the electrical object and the transmitter, and the electrical object and the transmitter being electrically conducted with each other through the pad surface stitch.

2. The luminous pad as claimed in claim 1, wherein the pad surface stitch is sewed by bridging any two different parts of the pad body.

3. The luminous pad as claimed in claim 1, wherein the pad surface stitch is an enameled wire.

4. The luminous pad as claimed in claim 1, wherein the pad surface stitch comprises an insulated wire and an enameled wire parallel to each other, and the pad surface stitch is sewed between the two pad surfaces of the pad body by a single-needle two-thread method.

5. The luminous pad as claimed in claim 4, wherein the insulated wire is protruded from the pad surface with an extent greater than the extent of the enameled wire protruded from the pad surface.

6. The luminous pad as claimed in claim 4, wherein the insulated wire has a diameter greater than the diameter of the enameled wire.

7. The luminous pad as claimed in claim 1, wherein the pad surface stitch comprises two insulated wires and an enameled wire disposed between the two insulated wires, and the pad surface stitch is sewed between the two pad surfaces of the pad body by a single-needle three-thread method.

8. The luminous pad as claimed in claim 7, wherein the insulated wire is protruded from the pad surface with an extent greater than the extent of the enameled wire protruded from the pad surface.

9. The luminous pad as claimed in claim 7, wherein the insulated wire has a diameter greater than the diameter of the enameled wire.

10. The luminous pad as claimed in claim 1, further comprising a rolled edge stitch and a connection stitch of the insulated wire, and the two pad surfaces comprising a first pad surface and a second pad surface, and the rolled edge stitch surrounding the light guide strip from the first pad surface to the second pad surface back and forth, and the rolled edge stitch being coupled to the pad surface stitch by passing and surrounding one of the two pad surfaces, and the connection stitch being coupled between the pad surface stitch and the rolled edge stitch by passing and surrounding the other one of the two pad surfaces back and forth.

11. The luminous pad as claimed in claim 10, wherein the pad surface stitch, the rolled edge stitch and the connection stitch are used to sew the light guide strip around the pad body by an overlock method.

12. The luminous pad as claimed in claim 10, wherein the pad surface stitch, the rolled edge stitch and the connection stitch are used for performing an overlock by a three-needle three-thread method.

\* \* \* \* \*